Aug. 16, 1949.  E. L. MILLER  2,479,177
DUPLEX VALVE
Filed Feb. 14, 1944  2 Sheets-Sheet 2
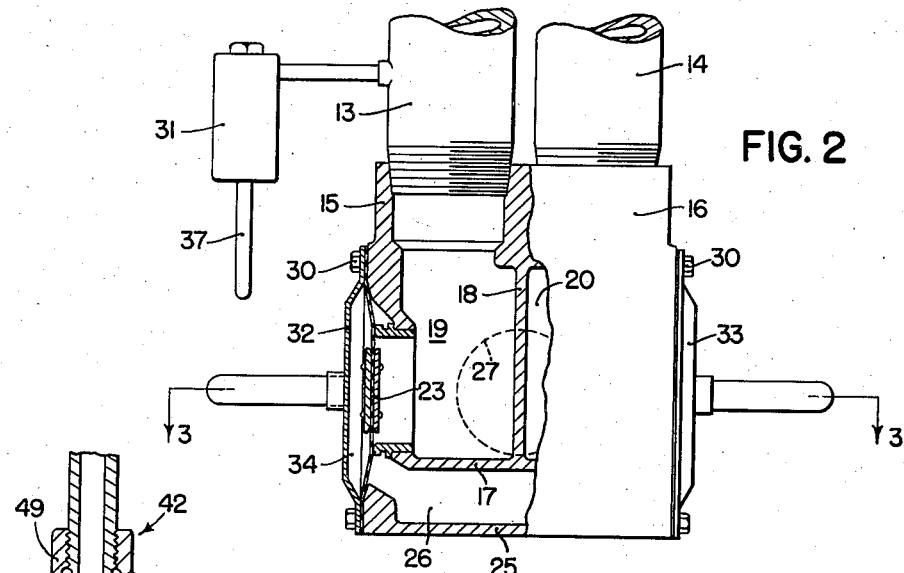
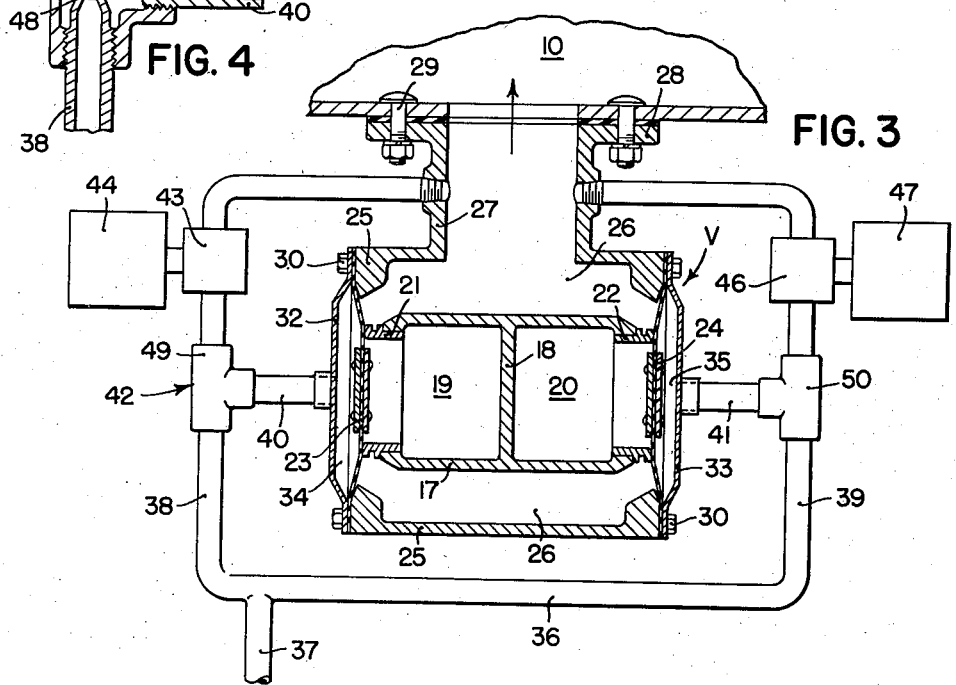
INVENTOR.
EDWARD L. MILLER
BY
Bruno C. Lechler
ATTORNEY Patented Aug. 16, 1949

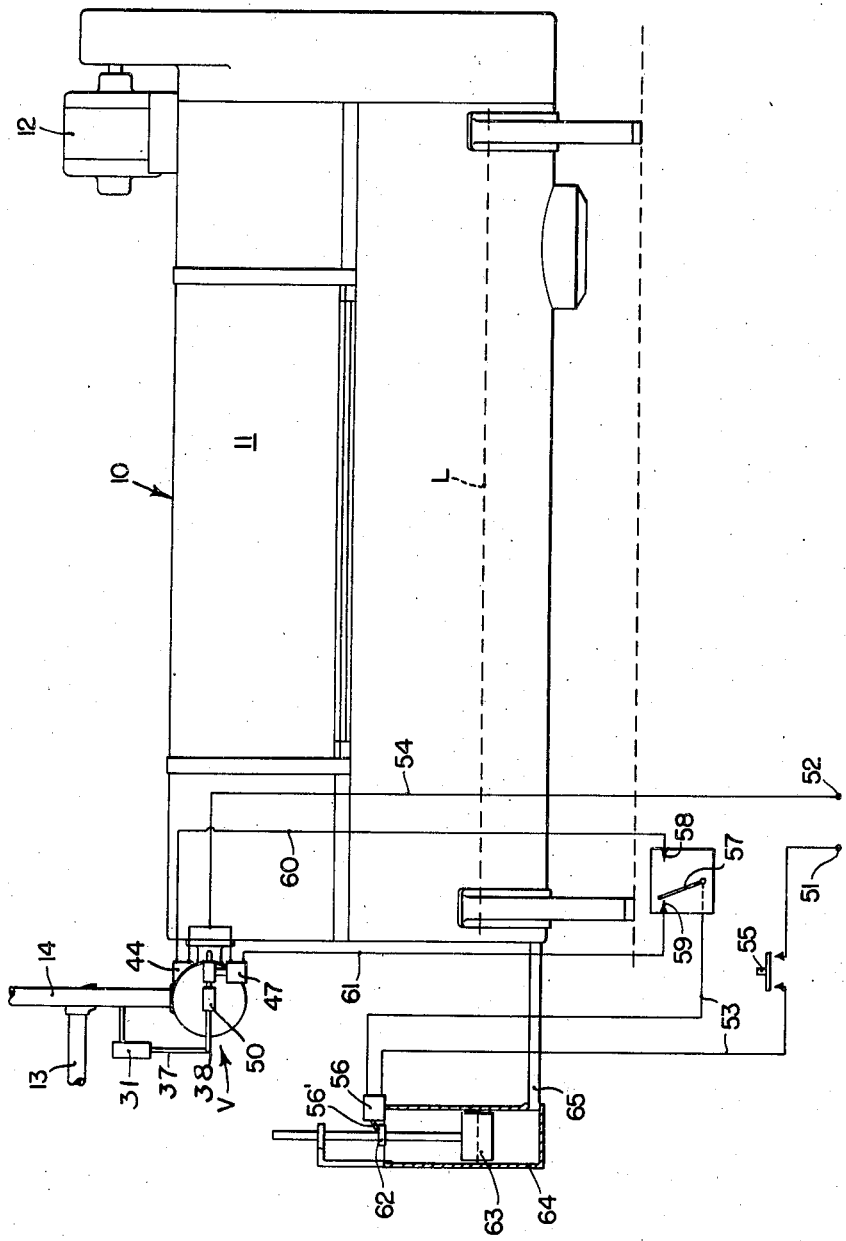

2,479,177

UNITED STATES PATENT OFFICE 2,479,177

DUPLEX VALVE

Edward L. Miller, Moline, Ill., assignor to American Machine and Metals, Inc., New York, N. Y., a corporation of Delaware Application February 14, 1944, Serial No. 522,265

2 Claims. (Cl. 137—144)

This invention relates to apparatus for supplying a mixing tank or similar container with two liquids, and more particularly to the construction and arrangement of a duplex valve forming part of such apparatus.

It is an object of the invention to provide a simple compact duplex diaphragm valve permitting a rapid and undisturbed flow of liquid through either or both of the two diaphragm valves of the duplex valve into a common housing surrounding both said diaphragm valves and discharging into the mixing tank.

A further object of the invention is to provide a duplex diaphragm valve whose diaphragms will close positively and without shock regardless of variations in the heads of the liquids to be passed through the duplex valve.

It is a further object of the invention to provide a duplex diaphragm valve having an inner body divided into two compartments and a housing surrounding this inner body at a distance to form an annular space extending from one end of the inner body to the other end so that liquid freed by either of the two diaphragms can flow unrestrictedly through said space on its way to the outlet passage leading from the housing to the mixing tank.

It is a further object of the invention to provide a duplex diaphragm valve having both its diaphragms operated by a servo- liquid taken from only one of two feeding pipes which supply the duplex valve with the two liquids to be mixed.

It is a further object of the invention to control the two diaphragms of the duplex valve by means of two pilot valves operated from a distance and arranged in two branches of a conduit, which two branches by-pass the duplex valve except that they are connected to diaphragm chambers behind the two diaphragms of the duplex valve.

It is a further object of the invention to arrange each of the pilot valves just mentioned in series with an ejector which is placed at such a point of the by-pass conduit that it will create a suction upon the coordinated diaphragm chamber and thereby cause the opening of that diaphragm when the pilot valve is opened from a distance.

A further object of the invention is to provide a duplex diaphragm valve wherein the two diaphragms are controlled hydraulically be means of pilot valves which in turn are actuated by solenoids the operation of which is under the control of an automatic switch responsive to changes in certain characteristics of the mixture in the container supplied by the duplex valve, such as changes in the temperature of the mixture.

A still further object of the invention is to cut out both solenoids and thereby to close or to keep closed both pilot valves as well as both diaphragm valves when the liquids supplied by the duplex valve to the mixing tank have brought the mixture in said tank to a present level.

The invention lends itself particularly well for use in cases where the mixing tank, such as the container of a commercial washing machine, is to be filled with a mixture of hot and cold water. The invention contemplates to combine with such a mixing tank a duplex valve having in a single housing two passageways, one forming part of the hot water supply line and the other forming part of the cold water supply line, each of these passageways being closable by a diaphragm which is controlled by a solenoid operated pilot valve in the manner mentioned above, and also a thermostat responsive to the temperature of the hot and cold water mixture building up in the container of the washing machine which determines when to open the diaphragm in the hot water line and to close the diaphragm in the cold water line, or vice versa.

Other objects of the invention will appear as the description proceeds, reference being had to the accompanying drawings, in which:

Fig. 1 is a side elevational view of a washing machine equipped with the invention;

Fig. 2 illustrates in a front view, partly in section, a duplex valve according to the invention;

Fig. 3 is a section along the line 3—3 in Fig. 2; and

Fig. 4 shows to a larger scale the cross section of one of the ejectors indicated in Fig. 3.

10 denotes a mixing tank, shown in Fig. 1 as the stationary container or shell of a commercial washing machine. This container or shell may enclose the conventional rotatable cylinder (not shown) which is accessible through a door 11 and driven by a motor 12. As usual with washing machines of this kind, the container 10 is to be filled with water of a prescribed temperature up to a relatively low level L only. To obtain the desired temperature of the water fill in the container 10, the latter is alternately supplied during the filling period with hot and cold water, the temperature of the hot water being above and the temperature of the cold water below the desired temperature of the water mixture. 13 denotes a cold water feeding pipe and 14 a hot water feeding pipe. While the cold water pipe 13 is shown in Fig. 1 as extending partly in a horizontal direction, this manner of illustration has been chosen in order to make the other pipe 14 clearly visible. In actual practice usually both the hot water pipe 14 and the cold water pipe 13 are derived from points substantially above the top of the container 10 of the washing machine. The pipes 13 and 14 are connected to tubular inlet portions 15 and 16, respectively, of a duplex valve generally indicated at V. This duplex valve comprises a hollow inner body 17 of a substantially rectangular cross section which is divided by a partition wall 18 into two compartments 19 and 20. Each compartment has an outlet opening in the form of a throat 21 and 22, respectively, each of said throats forming a seat for a diaphragm 23 and 24, respectively. An outer housing 25 surrounds the inner body 17 at a distance so that an annular space 26 is left between the inner body 17 and the outer housing 25. This annular space 26 is connected by means of an outlet passage 27 to the interior of the container 10, a flange 28 of the passage 27 being secured directly to the wall of the container 10 by means of bolts 29. The diaphragms 23, 24 extend across the annular space 26 and are held clamped, such as by screws 30, between reinforced end portions of the housing 25 and caps 32 and 33, the cap 32 forming a pressure chamber 34 behind the diaphragm 23 and the cap 33 a pressure chamber 35 behind the diaphragm 24. By creating hydraulic pressure in either the chamber 34 or 35 in a manner to be presently described, the corresponding diaphragm 23 or 24 will be held pressed against its seat 21 or 22. Since that surface of the diaphragm 23 or 24 which is exposed to the pressure chamber 34 or 35 is larger than the surface exposed to the compartment 19 or 20, the specific pressure in the pressure chamber need not be higher than the specific pressure in the compartment to keep the respective diaphragm upon its seat. If one of the pressure chambers, such as 35, is relieved from pressure to such an extent that the water pressure in the compartment 20 is able to deflect the diaphragm 24 outwardly, a flow of hot water is established through the outlet opening 22 of the compartment 20 to the annular space 26 between the inner body 17 and the outer housing 25, and thence through the outlet passage 27 into the container 10.

The annular space 26 between the inner body 17 and the housing 25 extends along the whole length of the inner body around a wide portion of the cross section thereof. In the example shown in the drawing this space 26 extends below the bottom of the inner body 17 as well as along the side walls thereof so as to surround said inner body completely with the exception of the angle or space taken up by the tubular inlet portions 15 and 16 of the inner body. Thus, when one of the diaphragms is open, the liquid passing through the outlet opening of the corresponding compartment is free to flow between the inner wall of the housing 25 and outer wall of the inner body 17 for any length thereof so that there will be no restriction in the flow of the liquid from the outlet opening of the inner body to the outlet passage 27 of the housing. Such unrestricted flow is assured even if at times both diaphragms 23 and 24 are open at the same time and, therefore, both liquids are supplied simultaneously by the duplex valve. In this case the two liquids supplied by the feeding pipes 13, 14 are premixed in the annular space 26 and the discharge passage 27 before they reach the container 10.

While it is advantageous to extend the annular space 26 around the inner body 17 over as large an angle as is possible in view of the connections to be made between the feeding pipes 13 and 14 and the inlet openings 15 and 16 of the inner body 17, in some cases a practically unrestricted flow of the liquids passing through the diaphragm seats of the duplex valve will be obtainable with an annular space 26 surrounding a somewhat smaller part of the cross section of the inner body 17. If the arrangement is such as to permit only one of the two diaphragms to be kept open at any one time, satisfactory results will be obtained if the space 26, besides extending underneath the bottom of the body 17, reaches at least as high as to the middle plane 3—3 indicated in Fig. 2. That is, the space 26 surrounds at least an angle of 180 degrees of the cross section of the inner body 17 while extending along the whole length of this inner body.

As has been mentioned before, the feeding pipes 13 and 14 are disposed vertically at least where they enter the tubular inlet portions 15, 16 of the duplex valve V. The outlet passage 27, however, is arranged at a right angle to the direction of these tubular inlet portions, thus extending horizontally from the outer housing 25. While this construction makes it possible to fasten the duplex valve V by means of the flange 28 directly to the front wall of the container 10 of the washer and thereby to dispense with otherwise necessary additional pipe fittings, such sidewise arrangement of the outlet 27 is depending for a satisfactory and smooth liquid discharge on an annular space 26 of sufficient length and angular opening as has been described above.

Each diaphragm 23 or 24 can be operated by admitting or withdrawing a liquid to or from the chamber 34 or 35 behind such diaphragm. A conduit 36 supplied with a control- or servo-liquid through a pipe 37 leads in two branches 38, 39 into the outlet passage 27 of the housing 25 thus forming a by-pass around the duplex valve. The branch 38 is connected by means of a pipe 40 with the diaphragm chamber 34 and the branch 39 by means of a pipe 41 with the diaphragm chamber 35. In the branch 38 there is arranged an ejector 42 and a pilot valve 43 operated by a solenoid 44, and a similar set comprising an ejector 45 and a pilot valve 46 operated by a solenoid 47 is arranged in the other branch 39. In the example shown in the drawing the ejectors 42 and 45 are inserted into the branch pipes 38 and 39 by means of T-shaped fittings 49, 50. Each ejector 42 and 45 comprises, as best shown in Fig. 4, a nozzle 48 which restricts the flow opening in the branch pipe 38 or 39 and is adapted to eject a stream of control liquid in the direction towards the coordinated pilot valve 43 or 46.

The mode of operation of the pilot valve control will be described with reference to the diaphragm 23, it being understood that the operation of the pilot valve control for the other diaphragm 24 is similar. When the pilot valve 43 is closed, the ejector 42 is drowned out and the control liquid derived from the pipe 37 and filling the chamber 34 keeps the diaphragm 23 pressed against its seat 21 holding the compartment 19 closed. When the solenoid 44 is energized in a manner to be described later, the pilot valve 43 opens and liquid in the branch pipe 38 is permitted to flow through the pilot valve 43 into the outlet passage 27. On account of the ejector nozzle 48 of the ejector 42 a suction is created in the connecting pipe 38 which draws the liquid previously contained in the diaphragm chamber 34 out of this chamber, reducing thereby the liquid pressure acting upon the back of the diaphragm 23 to an amount which is smaller than the total pressure exerted upon the front side of the diaphragm 23 by the liquid in the compartment 19. In consequence thereof, the diaphragm 23 is forced open allowing the cold water to pass the outlet opening 21 of the body 17 and flowing via the annular space 26 and the outlet passage 27 into the container 10. Thus, the diaphragm is forced open when the pilot valve 43 is opened. Similarly, the diaphragm 23 becomes closed when the pilot valve 43 is closed. The control liquid coming through the pipes 37, 38, while no longer free to flow through the pilot valve 43, is allowed to build up a pressure in the pressure chamber 34 which on account of the larger effective back surface of the diaphragm is sufficient to close the diaphragm against the pressure of the liquid in the compartment 19. The nozzle 48 in the ejector 42 will permit only a gradual building-up of the pressure in the pressure chamber and, therefore, the closing of the diaphragm will take place slowly enough to prevent any shocks or hammering. The smaller the nozzle 48 of the ejector, the slower will be the rate of closing of the diaphragm valve. If desired, ejectors may be used of that well known type in which the effective opening of the nozzle can be regulated or adjusted.

The control liquid supplied to the by-pass conduit 36 through the pipe 37 may be derived from any convenient source. In the example shown the control liquid is taken from the cold water feeding pipe 13 and passed through a filter 31 before entering the conduit 36. It will be seen that, since the control liquid is taken from the pipe 13, the specific pressure of the control liquid upon the back side of the diaphragm will be the same as the specific pressure exerted upon a smaller area of the diaphragm from the other side by the water in the compartment 19, regardless of wide variations in the head of the liquid in the feeding pipe 13. This reduces effectively the tendency to water hammer due to changes in the hydraulic head. Supply of both branch pipes 38 and 39 with control liquid from the same feeding pipe 13 makes it possible to choose that one of the two liquids to be mixed for operating the diaphragms which is better adapted for this purpose. In the example just described, where cold and hot water is to be mixed to provide a bath of preset temperature in a washing machine, it is better to use the cold water as the control liquid which has to pass through the ejectors. If the invention is to be applied to the mixing of two liquids of which one is, e. g., water and the other of a corrosive, gritty, or sticky nature, the water will constitute the liquid better suited to be used as the control liquid, and the by-pass conduit 36 will be connected with that feeding pipe 13 or 14 which carries this better suited liquid.

The two solenoids 44, 47 are placed each in an electric circuit which is controllable from a distance. The two circuits may be controllable independently from each other, or they may be interdependent in that respect that when one of the two solenoids 44, 47 is energized to open its pilot valve and diaphragm, the other is deenergized. An example for an arrangement of the latter kind is shown in Fig. 1. 51 and 52 are the terminals of an electric supply line 53, 54 manually controllable by a starter switch 55, such as a push-button. In the line 53 there is arranged a normally closed automatic switch 56 and in series therewith is a thermostatically controlled switch 57 adapted to cooperate alternatively with one of two contacts 58 and 59. The contact 58 is connected by means of a lead 60 to the solenoid 44 whereas the contact 59 is connected by a lead 61 to the solenoid 47. 54 acts as a common return lead for both solenoids. The thermostatic switch 57 is arranged so as to respond to the temperature of the water mixture in the container 10 of the washing machine. As long as the temperature of the mixture in the washer is below a certain given temperature, the thermostatic switch 57 will remain in the position shown, that is in contact with the contact 59 which is connected to the solenoid 47 operating the hot water supply. When the temperature of the mixture in the water rises above the set temperature the thermostatically controlled switch 57 will switch over to contact 58, deenergizing thereby the solenoid 47 for the hot water supply and energizing instead the solenoid 44 for the cold water supply. Cold water will thus be admitted to the washer until the temperature of the mixture therein falls sufficiently to reach a preset low temperature, whereupon the thermostatic switch 57 is returned to the position shown, conditioning thereby again the admission of hot water to the washer.

The automatic switch 56 is operable by an element 62 which is carried by a float 63 arranged in a well 64. The well 64 is in communication with the container 10 of the washer by means of a pipe 65, maintaining thereby in the well 64 the same liquid level as in the container 10. When the desired liquid level L in the container 10 is reached, the element 62 carried by the float 63 comes into contact with an arm 56' of the switch 56 and interrupts the line 53, shutting off the current for both solenoids 44, 47. This arrangement permits the operator to initiate the filling of the washing machine by operating the starter switch 55 and then to pass on to other duties, leaving it to the level responsive switch 56 to stop the filling when the desired level is reached.

While I have shown my invention in its application to a washing machine, I desire it to be understood that the invention is not restricted to such application. The duplex valve of my invention may be used for and in combination with any mixing tank, and for supplying to such a tank liquids of whatever nature may be necessary. It is further to be understood that while I have shown in the drawing a certain embodiment of the invention, this embodiment has been given by way of example only and that various changes, rearrangements and modifications may be made without departing from the spirit of the invention or the scope of the appended claims.

What I claim is:

1. An electrically controlled mixing valve unit controlling the flow of two fluids through a common outlet passage, comprising, a hollow generally cylindrical housing open at both ends, a flanged outlet passage extending radially from said housing and adapted to support the entire valve, a core angularly displaced from the discharge passage projecting inward through one side of the housing in a manner leaving a generally annular space extending throughout the length of the housing between the housing and the core and connecting with said flanged discharge passage, two adjacent radial fluid inlets to the core, a passage extending from each inlet to one of two pockets in the core, each pocket located proximate to one end of the housing, a bearing seat in the opening between each pocket in the core and the discharge passage in the housing surrounding the core, a flexible diaphragm at each end of the housing adapted to close said end of the housing, caps bolted to the ends of the housing holding the diaphragms in place and forming therewith pressure chambers, servo fluid connections associated with said caps in a manner to supply pressure fluid to and to exhaust pressure fluid from the respective chambers to cause said diaphragms to bear against said seats under fluid pressure between the cap and diaphragm thereby controlling the flow of fluid from either fluid inlet through its pocket over its seat into said annular space and out through said discharge pipe, an electrically controlled solenoid valve connected with each cap adapted to bleed the servo fluid from the cap thereby controlling the flow from one inlet line to the discharge outlet.

2. A mixing valve controlling the flow of two fluids through a common outlet, comprising, a hollow generally cylindrical housing open at both ends, a flanged outlet passage extending radially from said housing and adapted to support the entire valve, a core angularly displaced from the discharge passage projecting inward through one side of the housing in a manner leaving a generally annular space extending throughout the length of the housing between the housing and the core and connecting with said flanged discharge passage, two adjacent radial fluid inlets to the core, a passage extending from each inlet to one of two pockets in the core, each pocket located proximate to one end of the housing, a bearing seat in the opening between each pocket and the space in the housing which surrounds the core, a flexible diaphragm at each end of the housing adapted to close said end of the housing, caps bolted to the ends of the housing holding the diaphragms in place and forming therewith pressure chambers, servo fluid connections associated with said caps in a manner to supply pressure fluid to and to exhaust fluid from the respective chambers to cause said diaphragms to bear against said seats under fluid pressure between the cap and diaphragm thereby controlling the flow of fluid from either fluid inlet through its pocket over its seat into said annular space and out through said discharge pipe to be shut off.

EDWARD L. MILLER.

REFERENCES CITED

The following references are of record in the file of this patent:

UNITED STATES PATENTS

| Number | Name | Date |
|---|---|---|
| 237,854 | Garsed | Feb. 15, 1881 |
| 775,021 | Waterman | Nov. 15, 1904 |
| 971,934 | Siegrist | Oct. 4, 1910 |
| 1,103,756 | Gebhardt | July 14, 1914 |
| 1,501,331 | Gulick | July 15, 1924 |
| 1,605,765 | Papin | Nov. 2, 1926 |
| 1,747,640 | Morris | Feb. 18, 1930 |
| 1,819,045 | Snediker | Aug. 18, 1931 |
| 1,869,663 | Cartier | Aug. 2, 1932 |
| 1,885,367 | McKee | Nov. 1, 1932 |
| 1,990,653 | Kellman | Feb. 12, 1935 |
| 2,039,358 | Spencer | May 5, 1936 |
| 2,146,930 | Bassett | Feb. 14, 1939 |
| 2,262,290 | Kuhnle | Nov. 11, 1941 |
| 2,376,918 | Hughes | May 29, 1945 |

FOREIGN PATENTS

| Number | Country | Date |
|---|---|---|
| 11,362 | Germany | 1880 |
| 11,463 | Great Britain | 1910 |
| 12,336 | Great Britain | 1903 |
| 177,188 | Great Britain | Mar. 28, 1922 |